(12) United States Patent
Reams

(10) Patent No.: US 6,457,177 B1
(45) Date of Patent: *Sep. 24, 2002

(54) DUAL PORT INTERACTIVE MEDIA SYSTEM

(75) Inventor: David A. Reams, Toledo, OH (US)

(73) Assignee: DigitalConvergence.com Inc., Dallas, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,490

(22) Filed: Jan. 11, 1999

Related U.S. Application Data

(63) Continuation-in-part of application No. 08/510,900, filed on Aug. 3, 1995, now Pat. No. 5,907,793, which is a continuation-in-part of application No. 08/127,140, filed on Sep. 27, 1993, now abandoned, which is a continuation-in-part of application No. 07/877,078, filed on May 1, 1992, now abandoned.

(51) Int. Cl.[7] .............................................. H04N 7/173
(52) U.S. Cl. ........................ 725/106; 725/110; 725/116; 725/118
(58) Field of Search ................................ 348/1, 12, 13; 711/149, 107, 103, 104, 150, 168; 379/83, 88, 68, 67; 725/106, 116, 117, 118, 120, 115, 20, 109–110, 122

(56) References Cited

U.S. PATENT DOCUMENTS

| | | | |
|---|---|---|---|
| 3,668,312 A | 6/1972 | Yamamoto et al. | 348/17 |
| 4,071,697 A | 1/1978 | Bushnell et al. | 179/2 |
| 4,499,601 A | 2/1985 | Matthews | 455/166 |
| 4,591,906 A | 5/1986 | Morales-Garza et al. | 358/84 |

(List continued on next page.)

*Primary Examiner*—Andrew Faile
*Assistant Examiner*—Kieu-Oanh Bui
(74) *Attorney, Agent, or Firm*—Howison, Thoma & Arnott, L.L.P.

(57) ABSTRACT

An interactive broadcast or cable television or radio system, consisting of a television or radio tuner data receiver for receiving telephone number or electronic address data, a memory for storing the telephone number or electronic address data, a visual display for indicating the telephone number or electronic address data is stored, a pushbutton or other activation device for activating retrieval from memory of the stored telephone number or electronic address data and output of the retrieved telephone number or electronic address data to an autodialer or other transmission device to be transmitted to an external location, uses a memory having dual port memory functionality in order for simultaneous or substantially simultaneous retrieval of stored telephone number or electronic address data and storing of newly received telephone number or electronic address data.

10 Claims, 1 Drawing Sheet

U.S. PATENT DOCUMENTS

| | | | | |
|---|---|---|---|---|
| 4,630,108 A | | 12/1986 | Gomersall | 358/84 |
| 4,654,482 A | | 3/1987 | DeAngelis | 379/95 |
| 4,755,871 A | | 7/1988 | Morales-Garza et al. | 358/84 |
| 4,807,031 A | | 2/1989 | Broughton et al. | 358/142 |
| 4,816,904 A | | 3/1989 | McKenna et al. | 358/84 |
| 4,876,592 A | | 10/1989 | Von Kohorn | 358/84 |
| 4,890,322 A | | 12/1989 | Russell, Jr. | 380/20 |
| 4,894,789 A | | 1/1990 | Yee | 364/521 |
| 4,905,094 A | | 2/1990 | Pocock et al. | 386/106 |
| 4,907,273 A | | 3/1990 | Wiedemer | 380/16 |
| 5,023,934 A | | 6/1991 | Wheeless | 455/45 |
| 5,063,610 A | * | 11/1991 | Alwadish | 455/45 |
| 5,101,267 A | | 3/1992 | Morales-Garza | 358/84 |
| 5,121,430 A | | 6/1992 | Ganzer et al. | 380/48 |
| 5,128,752 A | | 7/1992 | Von Kohorn | 358/84 |
| 5,134,719 A | * | 7/1992 | Mankovitz | 455/154.1 |
| 5,146,612 A | | 9/1992 | Grosjean et al. | 455/45 |
| 5,239,540 A | * | 8/1993 | Rovira et al. | 370/77 |
| 5,262,860 A | * | 11/1993 | Fitzpatrick et al. | 358/142 |
| 5,285,278 A | | 2/1994 | Holman | 348/10 |
| 5,287,181 A | | 2/1994 | Holman | 348/473 |
| 5,303,393 A | | 4/1994 | Noreen et al. | 455/3.2 |
| 5,305,195 A | | 4/1994 | Murphy | 705/1 |
| 5,319,454 A | | 6/1994 | Schutte | 348/5.5 |
| 5,357,276 A | | 10/1994 | Banker et al. | 348/7 |
| 5,406,558 A | | 4/1995 | Rovira et al. | 370/77 |
| 5,406,626 A | | 4/1995 | Ryan | 380/9 |
| 5,425,101 A | * | 6/1995 | Woo et al. | 380/23 |
| 5,438,355 A | | 8/1995 | Palmer | 348/1 |
| 5,570,295 A | * | 10/1996 | Isenberg et al. | 364/514 |
| 5,600,364 A | * | 2/1997 | Hendricks et al. | 348/1 |
| 5,745,119 A | * | 4/1998 | Parchem et al. | 345/431 |
| 5,802,579 A | * | 9/1998 | Cray | 711/149 |
| 6,049,831 A | * | 4/2000 | Gardell et al. | 709/236 |
| 6,061,719 A | * | 5/2000 | Bendinell et al. | 709/218 |

* cited by examiner

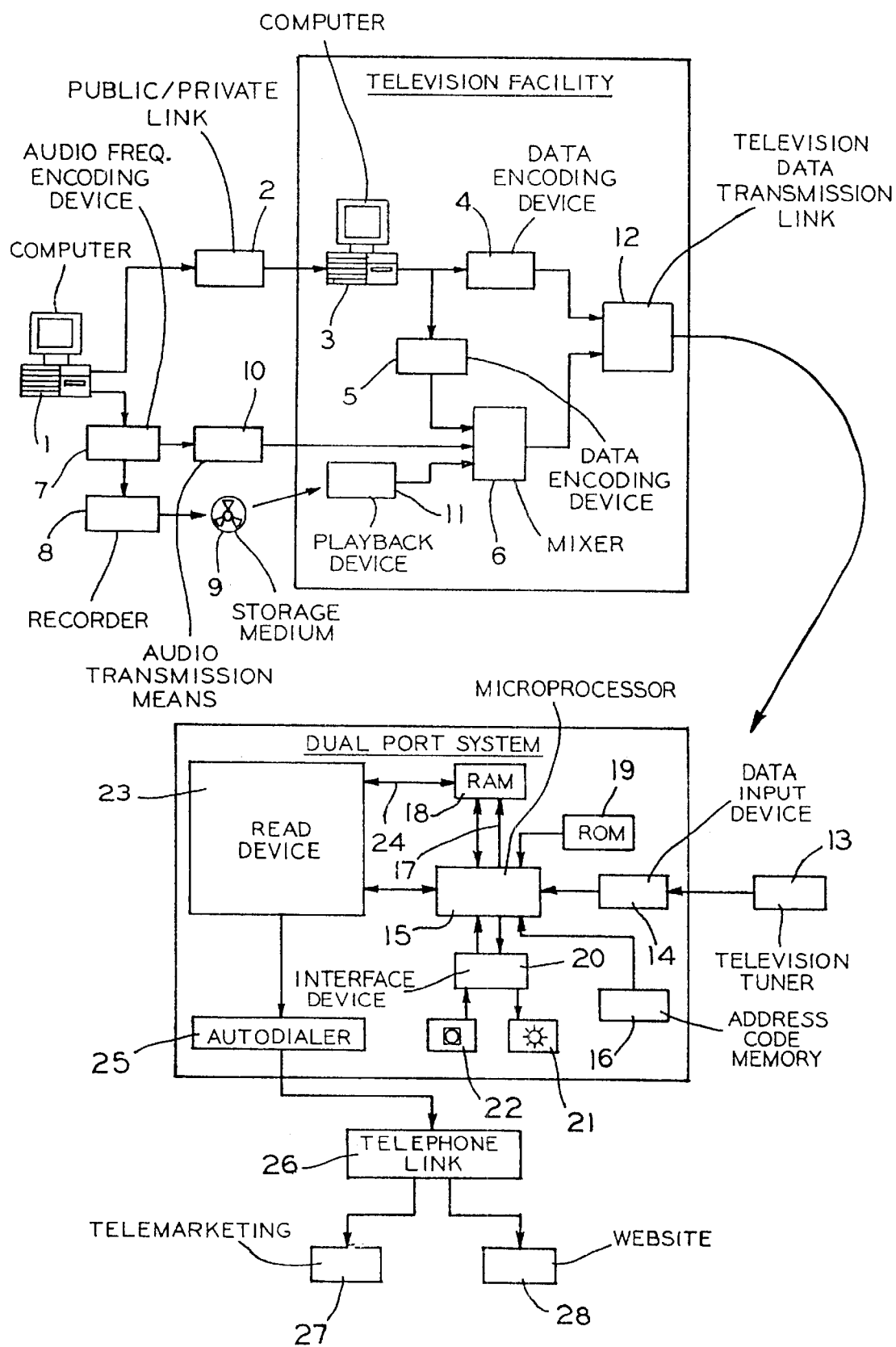

DUAL PORT INTERACTIVE MEDIA SYSTEM

RELATED APPLICATION

This application is a Continuation-In-Part of U.S. patent application, Ser. No. 08/510,900, filed Aug. 3, 1995 and entitled "TELEPHONE-BASED INTERACTIVE BROADCAST OR CABLED RADIO OR TELEVISION METHODS AND APPARATUS," now U.S. Pat. No. 5,907,793 issued May 25, 1999; which is a Continuation-In-Part of U.S. patent application, Ser. No. 08/127,140, filed Sep. 27, 1993, abandoned, and entitled "APPARATUS OR DEVICE AND SEVERAL PROCESSES FOR AN INTERACTIVE RADIO COMMUNICATIONS SERVICE;" which is a Continuation-In-Part of U.S. patent application, Ser. No. 07/877,078, filed May 1, 1992, abandoned, and entitled "INTERACTIVE RADIO COMMUNICATIONS."

TECHNICAL FIELD

The present invention relates to the field of storing in and retrieving from memory telephone number or electronic address data received in an interactive television or radio system. In particular, this invention relates to simultaneously storing in and retrieving from memory telephone number or electronic address data received in an interactive television or radio system.

SUMMARY AND BACKGROUND ART

Conventional interactive television systems utilize a telephone number or electronic address encoded in a video signal for viewers to automatically be placed in telephone or computer communication with a program source or sponsor. For example, D. S. Isenberg, et al, U.S. Pat. No. 5,570,295 teaches a system for receiving and detecting telephone number data. encoded in video signals, storing the telephone number data and transmitting the telephone number data over a telephone network to initiate a call. G. P. Fitzpatrick, et al, U.S. Pat. No. 5,262,860 discloses a system that utilizes stored telephone number data to automatically establish communication between a data processing system and an external location.

Said prior art systems provide means for automatically dialing received telephone number data in response to television program material. Further, said prior art systems teach means for accessing telephone number data stored in memory for viewer interactive response.

Should new telephone number data be received while stored telephone number data is being accessed for automatic dialing, however, said prior art systems do not provide any means for storing said newly received telephone number data simultaneously or substantially simultaneously while said previously stored telephone number data is being accessed for automatic dialing. Likewise, no means are provided in the prior art for accessing stored telephone number data for automatic dialing simultaneously or substantially simultaneously while newly received telephone number data is being stored.

Specifically, the problem in prior art interactive television systems is that the memory used comprises single port functionality limited to providing memory access either to retrieve stored telephone number or electronic address data or to store newly received telephone number or electronic address data, not both said retrieving and said storing simultaneously or substantially simultaneously. Prior art systems have neither identified this memory limitation as a problem nor recognized the desirability of overcoming this memory limitation.

This limitation in prior art, however, severely limits the utility of interactive systems, for example, when multiple separate telephone number or electronic address data sets are encoded in program material to be received in rapid fire succession one-after-the-other. Such program material may be an advertisement advertising multiple products each having a different associated telephone number or electronic address encoded for reception at or near the time the product is mentioned. Because such utility would undoubtedly result in the simultaneous access of stored telephone number or electronic address data and storing of newly received telephone number or electronic address data, the described prior art memory limitation would preclude such utility.

Similarly, when a television channel is changed during access of previously stored telephone number or electronic address data for transmission in response to a program, new telephone number or electronic address data associated with new program material tuned-in may be received to be stored. Said prior art limitation would also preclude this utility.

A possible solution to the above-referenced problem may be programming an interactive response device to process received telephone number or electronic address data for viewer response only at a time corresponding to reception of a relevant or associated portion of the program material. Such programming, however, would add undue complexity and cost to both the device and system for encoding telephone number or electronic address data.

Another possible solution to the described problem may be equipping interactive response devices with dual port memory so as to be able to store newly received telephone number or electronic address data and retrieve from memory previously stored telephone number or electronic address data simultaneously or substantially simultaneously. Yet, as disclosed in P. D. Crary, U.S. Pat. No. 5,802,579, which is incorporated herein by reference, dual port memory requires more complex control circuitry, greater power consumption and more gates to implement than a similarly sized single-ported memory.

In solving the above-referenced problem, said costs of dual port memory design must be balanced against the benefits offered by the dual port memory. This invention recognizes said dual port memory benefits to outweigh said costs and thus solves the above-referenced problem through providing in an interactive television or radio system dual port memory means for simultaneous or substantially simultaneous storing in and retrieving from memory telephone number and electronic address data.

Accordingly, the overriding object of the present invention is to equip consumer response devices to be used in an interactive television or radio system with dual port memories.

A related object of the instant invention is to provide dual port memory means in an interactive television or radio system for storing received telephone number or electronic address data and accessing stored telephone number or electronic address data simultaneously or substantially simultaneously.

Additional objects of this invention will become apparent from the detailed description contained herein.

BRIEF DESCRIPTION OF THE DRAWING

The Drawing depicts 1) is a system for generating a data set including data representative of a telephone number or electronic address associated with commercial or non-commercial television program material, encoding the data set for television data transmission and transmitting the data set to a television tuner data receiver and 2) is a television tuner data receiver for receiving the data set interfaced to a DUAL PORT SYSTEM for processing in predetermined manner at least the telephone number or electronic address data, writing said data into memory, indicating by visual display means that the telephone number or electronic address data is stored in memory, activating reading of the stored data, reading the stored data and outputting the read telephone number or electronic address data to transmission means to be transmitted to an external location wherein the memory comprises access means capable of providing the write and read means simultaneous or substantially simultaneous access to the memory.

While the Drawing is specific to broadcast or cable television, the principles and teachings embodied herein apply equally to broadcast or cable radio. Further, broadcast or cable radio may consist of Digital Audio Radio (DAR), including satellite and/or terrestrial digital audio broadcasting (DAB) and digital cable radio.

DETAILED DESCRIPTION OF A PREFERRED EMBODIMENT

A. Data Generating, Encoding and Transmission

In the Drawing, COMPUTER 1/3 generates a data set including data (preferably digital data) representative of a telephone: number or electronic address to, for example, TELEMARKETING 27 or WEBSITE 28 associated with commercial or non-commercial television program material. Said telephone number may be a toll free telephone number, a local telephone number including a local dial-up Internet telephone number or an Internet Protocol (IP) number for IP telephony and may include an electronic address such as a Website address. For the in-car broadcast radio market, said telephone number may be a cellular radio number. To identify said telephone number or electronic address data, said data set may further include an header code of predetermined format to be detected at the receiver unit.

COMPUTER 1, residing at a location exterior to TELEVISION FACILITY, may generate said data set and transmit it via PUBLIC/PRIVATE LINK 2, which may be the public switched telephone network (PSTN), an integrated services digital network (ISDN) or similar wire or wireless facility, to COMPUTER 3 located at TELEVISION FACILITY (an analog or digital broadcast or cable television facility). At COMPUTER 3, said data set is then stored and transmitted at appropriate times in conjunction with the facility's transmissions to the general public.

The data set is transmitted via TELEVISION DATA TRANSMISSION LINK 12, which may be a broadcast or cable television data or program audio channel, to TELEVISION TUNER 13 data receiver, which may be a set-top box (STB). DATA ENCODING DEVICE 4 is used to encode said data set to be transmitted via a broadcast or cable television data channel such as a subcarrier, Vertical Blanking Interval (VBI) channel or a digital television (DTV)-designated data channel. DATA ENCODING DEVICE 5 is used to encode said data set in:.audio frequency format to be mixed with program audio signals through MIXER 6.

The data set may be embedded as program audio data while the program material is being produced, for example at an advertising agency or production house. AUDIO FREQUENCY ENCODING DEVICE 7 may be used to embed the data set in a program audio signal. The embedded data set is then fed to RECORDER 8 and onto STORAGE MEDIUM 9, or, alternatively, sent through AUDIO TRANSMISSION MEANS 10 such as a network program distribution system. STORAGE MEDIUM 9 may then be sent to TELEVISION FACILITY for later playback to viewers via PLAYBACK DEVICE 11.

B. Dual Port System

1. Data Input and Processing

The data set received via broadcast or cable TELEVISION TUNER 13 data receiver, i.e. a data or program audio channel, is fed via DATA INPUT DEVICE 14 to MICROPROCESSOR 15 for predetermined processing. Any conventional microprocessor or central processing unit device adapted for the dual port system specified herein may be used as MICROPROCESSOR 15. The program of instructions which controls the actions of MICROPROCESSOR 15 is stored in ROM 19, which may use electrically erasable programmable ROM (EEPROM) and non-volatile memory storage.

Optionally, said data set may include certain address information for locator utility, which may be designated in the telephone number or electronic address data itself or by a wholly separate code, such as geographic, area code or individual receiver address information. With a toll free telephone number, said address information, i.e. the "800" area code, may designate a global address. For mobile (in-car radio) units, said address information may comprise GPS signals to be processed by an in-car GPS device.

Using this locator feature, ADDRESS CODE MEMORY 16 stores preprogrammed address information indicating the unit's pre-assigned address, which may be assigned when the unit is purchased and reflect the purchaser's home address. If such address information is detected, ADDRESS CODE MEMORY 16 inputs the preprogrammed address information to MICROPROCESSOR 15 to compare the unit's pre-assigned address with the received address information. Only if a match is detected does MICROPROCESSOR 15 further process the data set using this locator feature.

2. Dual Port Memory

Upon receiving telephone number or electronic address data to be stored from DATA INPUT DEVICE 14, MICROPROCESSOR 15 routes said data via WRITE ADDRESS AND DATA BUS 17 to be stored in a predetermined address location in RAM 18, which stores the data as digital data and may have a plurality of memory locations for storing digitally encoded telephone number or electronic address data in predetermined order (i.e. FIFO). MICROPROCESSOR 15 stores in a predetermined memory location, preferably located in or adjacent to MICROPROCESSOR 15, said predetermined address location in RAM 18 in which said data is stored.

RAM 18 has dual port memory functionality for data to be written into and read out from RAM 18 during the same memory access. To reduce cost and complexity, the write data and read data means embodied in this invention may be limited to respective write and read access only.

Advantageously, said dual port memory functionality enables stored telephone number or electronic address data to be accessed via READ DEVICE 23 simultaneously or substantially simultaneously while newly received telephone number or electronic address data received via TELEVISION TUNER 13 data receiver is being stored via WRITE ADDRESS AND DATA BUS 17 in RAM 18.

Conversely, said dual port memory functionality enables newly received telephone number or electronic address data received via TELEVISION TUNER 13 data receiver to be stored simultaneously or substantially simultaneously while previously stored telephone number or electronic address data is being accessed via READ DEVICE 23.

a. Dual Memory Ports

RAM 18 dual port memory functionality may be implemented using two physical memory ports as disclosed in W. L. Davis, U.S. Pat. No. 4,769,642, which is incorporated herein by reference. In this embodiment, RAM 18 is accessed via two separate memory ports.

The dual port memory system disclosed in W. L. Davis, U.S. Pat. No. 4,769,642 includes an address decoder for detecting address signals indicating transmitted data is intended for the receiver. The address decoding routine is activated when the receiver is turned on and compares received address information with pre-stored address information to detect a match.

When the dual port memory system disclosed in W. L. Davis, U.S. Pat. No. 4,769,642 receives address signals indicating data intended for the receiver is forthcoming, a microprocessor-based controller activates dual port memory, serves to receive the data and route it to be stored in the dual port memory via one of two memory input ports. In addition, control words are used to inform memory control circuitry as to the location(s) of stored data. Further, said system uses control words to indicate status information of whether data has been read previously and the order data has been received.

A microprocessor stores the control words in a predetermined memory location. Using the control words for direction, received data may be stored in an unused memory location or, if an unused memory location is unavailable, over data which has been read or the oldest stored data.

One port of the dual port memory is coupled to a data receiver and the other port to a speech synthesizer. Through port address and data busses, data may be stored in and retrieved from the dual port memory simultaneously.

b. Single Ported Memory

Alternatively, dual port RAM 18 functionality may be obtained by using a single-ported memory having dual port memory functionality such as the SRAM array and pipelined dual port integrated circuit memory disclosed in S. G. Nogle, et al, U.S. Pat. No. 5,781,480, which is incorporated herein by reference. In said pipelined dual port embodiment of this invention, SRAM array is a single port RAM 18 functioning as a dual port memory.

Further, in the dual port SRAM system disclosed in S. G. Nogle, et al, U.S. Pat. No. 5,781,480, a single-ported SRAM array comprises a plurality of memory cells. A memory cell includes N-channel metal oxide semiconductor (MOS) transistors and inverters. Preferably, in the present invention, one cell stores one telephone number or address.

An address decoder coupled to the plurality of memory cells receives memory cell address information and selects the memory cell to be accessed. Said memory cell address information, consisting of a first or second address, is provided by, respectively, first and second address ports coupled to the address decoder.

Data is written into or read from the addressed memory cell through, respectively, write or read data ports. A control circuit is coupled to the address decoder, first and second address ports and write/read data ports to control memory cell access. In the instant invention, said control circuit functionality may reside in MICROPROCESSOR 15.

A memory cell is accessed by activation of a single word line using a single bit line pair. Two accesses to memory may always occur within a single clock cycle of the accessing data processor's clock.

Advantageously, the dual port SRAM embodiment of this invention enables telephone number or electronic address data received while previously stored telephone number or electronic address data is being read from one RAM 18 memory cell to be stored in another RAM 18 memory cell substantially simultaneously while said previously stored data is being read. Conversely, this embodiment allows reading from one RAM 18 memory cell of previously stored telephone number or electronic address data to be accomplished substantially simultaneously while newly received telephone number or electronic address data is being stored in another RAM 18 memory cell. As used in regard to this embodiment, the term "substantially simultaneously" means within a single clock cycle of the MICROPROCESSOR 15 clock.

Using the SRAM array dual port system disclosed in S. G. Nogle, et al, U.S. Pat. No. 5,781,480, several benefits over prior art dual port systems are achieved. First, a memory cell requires six instead of eight transistors. Second, a memory cell needs only to be connected to a single complimentary pair of bit lines instead of two separate pairs of bit lines, saving two additional access transistors. Furthermore, only a single word line is needed to access a memory cell rather than two word lines for the dual-ported memory cell, thereby also reducing the amount of metal wiring into and out of a memory cell and resulting in relatively inexpensive SRAM cell construction.

3. Visual Display, Activation and Read/Transmission

Simultaneous with or immediately after routing received telephone number or electronic address data via WRITE ADDRESS AND DATA BUS 17 to be stored in RAM 18, MICROPROCESSOR 15 sends a control signal via INTERFACE DEVICE 20 to activate LED 21 or other visual display means such as LCD or text display means (not shown). LED 21, which may be any appropriate color(s), indicates to one or more television viewers that a telephone number or electronic address associated with viewed program material is being stored and is available to be automatically dialed or connected (transmitted) via predetermined transmission means. Further, LED 21 may flash to reflect special urgency in responding such as an ongoing sale with respect to an advertised product.

If interested, a viewer may activate automatic dialing or connecting of the stored telephone number or electronic address data by activating PUSHBUTTON 22 or other activation means such as a keypad or voice recognition unit (not shown). In another embodiment of this invention, said activations means may also be used to activate writing or storing of received telephone number or electronic address data via WRITE ADDRESS AND DATA BUS 17 in RAM 18, in which case MICROPROCESSOR 15 would not immediately route telephone number or electronic address data to WRITE ADDRESS AND. DATA BUS 17 when input from DATA INPUT DEVICE 14. Either or both of said visual display means and activation means may reside in a conventional remote control unit utilizing infrared signalling.

Activating said activation means sends a control signal via INTERFACE DEVICE 20 to MICROPROCESSOR 15 to activate READ DEVICE 23 to read via READ ADDRESS AND DATA BUS 24 the telephone number or electronic address data stored in said predetermined address location in RAM 18. READ DEVICE 23 then accesses or reads the stored telephone number or electronic address data directly from RAM 18 via READ ADDRESS AND DATA BUS 24.

Upon retrieving said telephone number or electronic address data, READ DEVICE 23 outputs said data to any appropriate transmission device and link such as AUTODIALER 25 and TELEPHONE LINK 26. AUTODIALER 25, which may be STB telephone means, a modem or, for in-car radio units, cellular telephone means, automatically dials the telephone number or automatically connects the electronic address by transmitting the telephone number or electronic address data via TELEPHONE LINK 26 to, for example, TELEMARKETING 27 or WEBSITE 28. TELEPHONE LINK 26 may be a wireline telephone, cellular radio or computer link or a cable television system adapted for telephone transmission.

AUTODIALER 25 dialing of the telephone number may be accomplished by pulse dialing, DTMF dialing or out-of-band signalling as disclosed in D. S. Isenberg, et al, U.S. Pat. No. 5,570,295, which is incorporated herein by reference. Illustratively, AUTODIALER 25 may generate DTMF tones corresponding to stored telephone number data and transmit the tones via an off-hook telephone interface.

DUAL PORT SYSTEM may be integrated in TELEVISION TUNER 13 or built separately with an interface to the tuner's data or program audio channel. Further, all of the DUAL PORT SYSTEM components may be combined in a single DSP or integrated circuit (i.e. ASIC) device.

While AUTODIALER 25 may be integrated in DUAL PORT SYSTEM sharing MICROPROCESSOR 15 as data processing means, AUTODIALER 25 may alternatively have its own data processor and thus not be limited to the interactive television or radio utility disclosed herein. Indeed, AUTODIALER 25 may function as a stand-alone home or car telephone unit for making and receiving conventional telephone calls, having a built-in or detachable interface to DUAL PORT SYSTEM to serve as the SYSTEM's transmission means.

Clearly, numerous modifications and variations of the instant invention are possible in light of the above teachings. It is therefore understood that, within the scope and spirit of the claims made herein, the invention may be practiced otherwise than as specifically described herein, the invention may be modified in arrangement and detail without departing from such scope and spirit and, further, the utility described herein is by way of example.

I claim:

1. A method for interfacing a user at a first location to information at a remote location over a communication link from the first location in order to facilitate transfer of remote information to the user, comprising the steps of:

transmitting over a broadcast medium control information from a broadcast source to the first location, which control information is associated with facilitating linking of the user at the first location to information at the remote location via the communication link and which control information comprises information encoded in a broadcast signal transmitted over the broadcast medium having contained therein audio and video information and wherein the step of receiving the transmitted broadcast comprises extracting the video and audio information therefrom and wherein the step of extracting the control information occurs after video and audio are extracted;

receiving the transmitted broadcast with the control information and, in response to receiving the broadcast, extracting the control information from the broadcast; and in response to the step of extracting, connecting the first location to the remote location in accordance with information contained in the control information in order for the user to obtain the remote information from the remote location.

2. The method of claim 1, wherein the control information comprises routing information for establishing a connection between the first location and the remote location over the communication link.

3. The method of claim 1, wherein the control information has associated therewith routing information for establishing a connection over the communication link.

4. The method of claim 1, wherein the control information comprises information encoded in a broadcast signal transmitted over the broadcast medium in the step of transmitting.

5. The method of claim 1, wherein the step of extracting the transmitted control information comprises decoding the received encoded information to extract therefrom the control information.

6. The method of claim 1, wherein the control information is in an audio format.

7. The method of claim 1, wherein the control information is encoded in an audio format and the step of extracting comprises the step of decoding the encoded information to extract therefrom the control information, wherein the control information is not audio information.

8. The method of claim 6, wherein the control information is embedded within the audio portion of the broadcast.

9. The method of claim 1, wherein the step of receiving comprises selecting a: user response corresponding to the indicator displayed upon receipt of the transmitted control information.

10. The method of claim 1, wherein the control information is perceptible to the user during the step of transmitting.

* * * * *